March 23, 1965 D. C. OLSON 3,174,176
LOCK FOR RELATIVELY PIVOTED STRUCTURES
Filed Jan. 3, 1963 4 Sheets-Sheet 1

INVENTOR.
DAVID C. OLSON
BY
Agent

March 23, 1965     D. C. OLSON     3,174,176
LOCK FOR RELATIVELY PIVOTED STRUCTURES
Filed Jan. 3, 1963     4 Sheets-Sheet 3

INVENTOR.
DAVID C. OLSON
BY
George L. Sullivan
Agent

United States Patent Office 3,174,176
Patented Mar. 23, 1965

3,174,176
LOCK FOR RELATIVELY PIVOTED STRUCTURES
David C. Olson, Burbank, Calif., assignor to Lockheed
Aircraft Corporation, Los Angeles, Calif.
Filed Jan. 3, 1963, Ser. No. 249,204
8 Claims. (Cl. 16—35)

This invention relates to a lock for two relatively pivoted structural units and more particularly to means for positively locking sprung casters for the prevention of relative vertical movement thereof.

In circumstances wherein casters are pivoted to support the four corners of cargo carrying equipment it has been the practice to provide sprung casters capable of absorbing dynamic loads, thus providing shock protection for both the cargo and the equipment. Under such circumstances when it has become necessary that the variable height characteristics of the casters be removed, it has been the common practice to utilize a jack to contact the ground, thereby removing compression loads from the caster. Hence, when the equipment was under for hoisting purposes or where personnel were required to stand upon the equipment, the casters were prevented from being further compressed.

While the above jack-type equipment is generally satisfactory under the described conditions, many instances occur when a lightening of the load results from a portion of the load being removed from the equipment. A lightening of the load on certain of the casters also results from a shifting of the center of gravity of the load. In such cases the spring means which forms a portion of the caster causes the load to be raised. This lifts the jack from the ground, thereby causing an unstable condition. In activities wherein the supported load is intended for attachment to separate structure it is usually critical that the attachment points remain stable throughout the operation. Instability under such conditions results in a misalignment of attached points and increased difficulty in accomplishing the ultimate attachment.

A primary objective of the present invention is to lock out the spring action of the caster in both directions.

Another object is to provide means whereby a sprung caster can be temporarily transformed into a rigid structure.

A further object is to provide means whereby two relatively pivoted structural units may be rigidly retained with respect to one another.

A still further object is to provide a lock which is easily engaged and disengaged to introduce vertical rigidity into a sprung caster.

Other objects of invention will become apparent from the following drawings, detailed description and appended claims.

Figure 1:
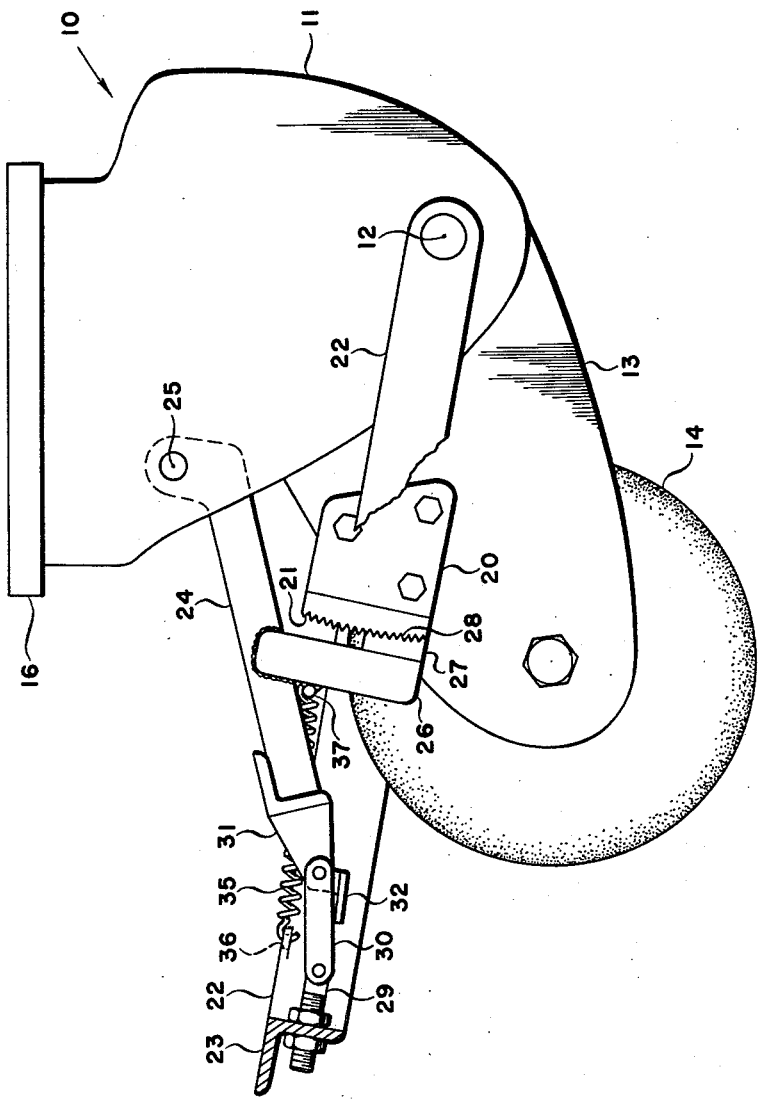
FIGURE 1 is a side elevational view of a typical sprung caster incorporating the lock mechanism of this invention, the lock being engaged.

Referring now to the drawings, a caster of the sprung type is generally indicated by the numeral 10. A typical sprung caster of type contemplated is shown in detail in a co-pending patent application entitled "Cargo Tie-Down and Suspension Apparatus," Serial No. 119,238, now Patent No. 3,066,950. The caster 10 includes a fixed structural member or housing 11 pivotally connected about an axis 12 to a second structural member 13. The structural member 13 has a wheel 14 attached for rotation thereon. The structural members 11 and 13 are spring loaded such that their opposite ends normally tend to separate, pivoting around axis 12. Any conventional spring means such as spring 15 may be provided for this purpose.

A pad such as illustrated at 16 is usually fixed to the upper extremity of the structural member 11 and adapted to receive in fixed relation thereto various structures such as vehicle frames, indicated by numeral 17.

When a load is placed upon the vehicle frame 17 the normal tendency of the caster 10 is to provide a shock absorbing characteristic through the action of spring 15 in its compression and extension relations to the structural members 11 and 13. The load application applies a downward movement of force to the caster 10, overcoming the action of the spring 15 normally tending to separate the structural members 11 and 13. The result is a vertical displacement of the upper portion of the caster 10 and its supported load.

As noted above, it is sometimes desirable that this caster spring action be removed to prevent this vertical movement. By means of the present invention the spring action is locked out and the caster is temporarily transformed into an essentially rigid structure, thereby preventing vertical movement of the supported load regardless of the addition to, removal of, or shifting of portions of such load.

Figure 2:
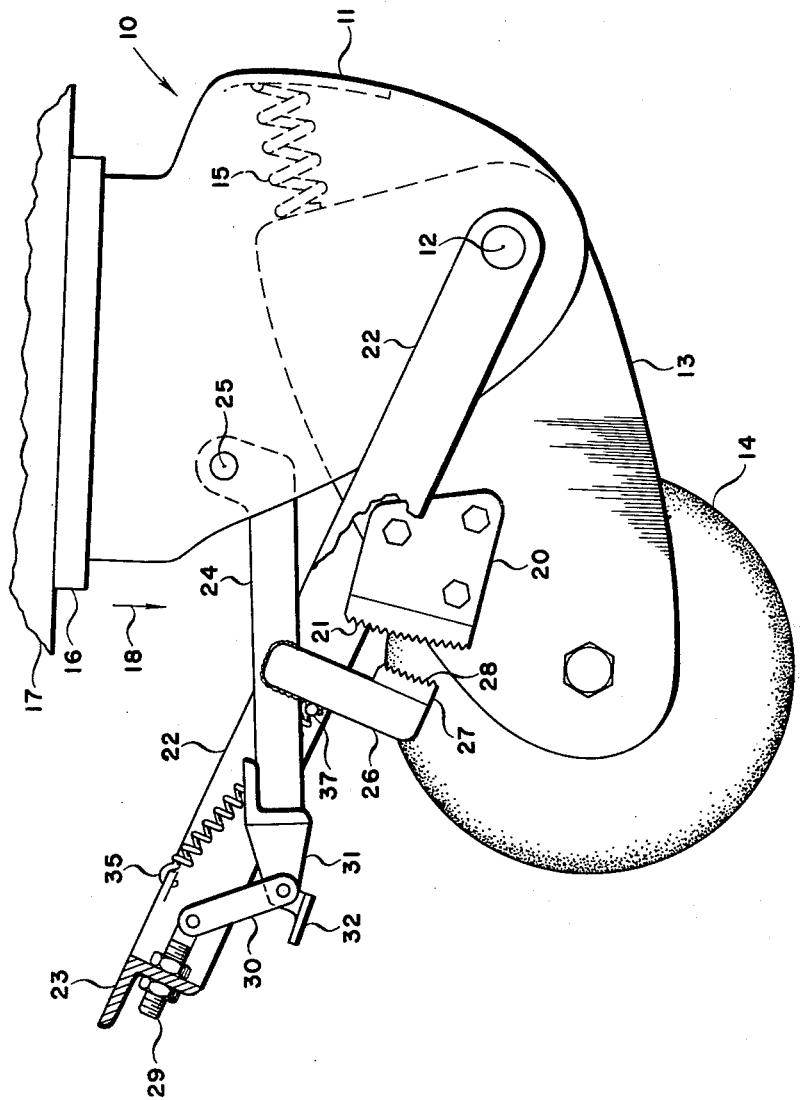
FIGURE 2 is an elevational view similar to FIGURE 1, illustrating the lock in a disengaged condition.

The lock of this invention is generally provided by supplying mutually engageable means connected to the structural members 11 and 13 to bypass the caster spring action and provide the substantially rigid structural interconnection therebetween. The wheel supporting structure 13 is provided with a lock receiving means 20 which includes, for example, a serrated surface area 21 adapted for engagement with and locking with respect to a similarly shaped portion to be hereinafter described. In the usual case, the structural member 13 is a two-sided or U-shaped member surrounding the wheel 14. Therefore, it is preferred that a lock receiver 20 be provided on each side thereof. However, for sake of clarity only one such receiver is illustrated in FIGURES 1 and 2. The lock receiver 20 may be bolted, welded, or otherwise attached to the structural member 13, or it may be integrally constructed.

A generally U-shaped frame 22 (see FIGURE 2) is attached to the housing 11 to pivot about the axis 12. The frame 22 includes a step or actuator portion 23 upon an extremity opposite its connection to the housing 11.

An arm member 24, also usually of a U-shaped configuration, is pivotally attached to the housing 11 for movement about the axis 25. Fixed to arm 24 and depending from an intermediate region thereof in a generally downward direction, is an extension 26 having a lock portion 27 affixed thereto. The lock portion 27 is, for example, provided with a serrated surface 28 adapted for locking engagement with the similarly serrated surface 21. The surface 28 is preferably of shorter length than is the surface 21. It is a requirement, however, that sufficient surface area, both as to surface 21 and surface 28, be provided to accomplish a positive lock, regardless of whether the spring means 15 is fully extended or fully compressed. It is generally desirable that when the spring is fully compressed the lower extremities of both serrated surfaces are substantially flushed (FIGURE 1) and that when the spring is fully extended the upper extremities of the engageable surfaces are substantially flushed.

Approximately centrally of the step portion 23 an adjustable attachment member 29 is provided. Attached to pivot with respect to this member is at least one link 30 having its opposite extremity similarly pivotally connected to a pad 31 extending from a central region of the U-shaped arm 24. Extending generally outward and downward from the pad 31 is a stop means or shoe 32 adapted to be contacted by the link 30 to prevent excessive movement thereof while permitting sufficient movement for the locking action hereinafter described. Although only a single link 30 is illustrated in the drawings, it is to be understood that the preferred embodiment includes a pair of such links, one link being disposed on either side of the adjustable attachment member 29 and the pad 31. The stop means 32 is of sufficient width to facilitate contact by each such link. A pair of tension springs 35 are connected between attachment holes 36 upon the frame 22 and a pair of attachment pins 37 affixed to the extensions 26. These springs 35 normally tend to remove the serrated surface 28 from engagement with the surface 21. Thus, when sufficient force is supplied to the frame 22 to interrupt such engagement the springs 35 act to carry the frame 22 and its connected structure into the position illustrated in FIGURE 2 wherein interference of the engageable surfaces cannot result.

Figure 3:
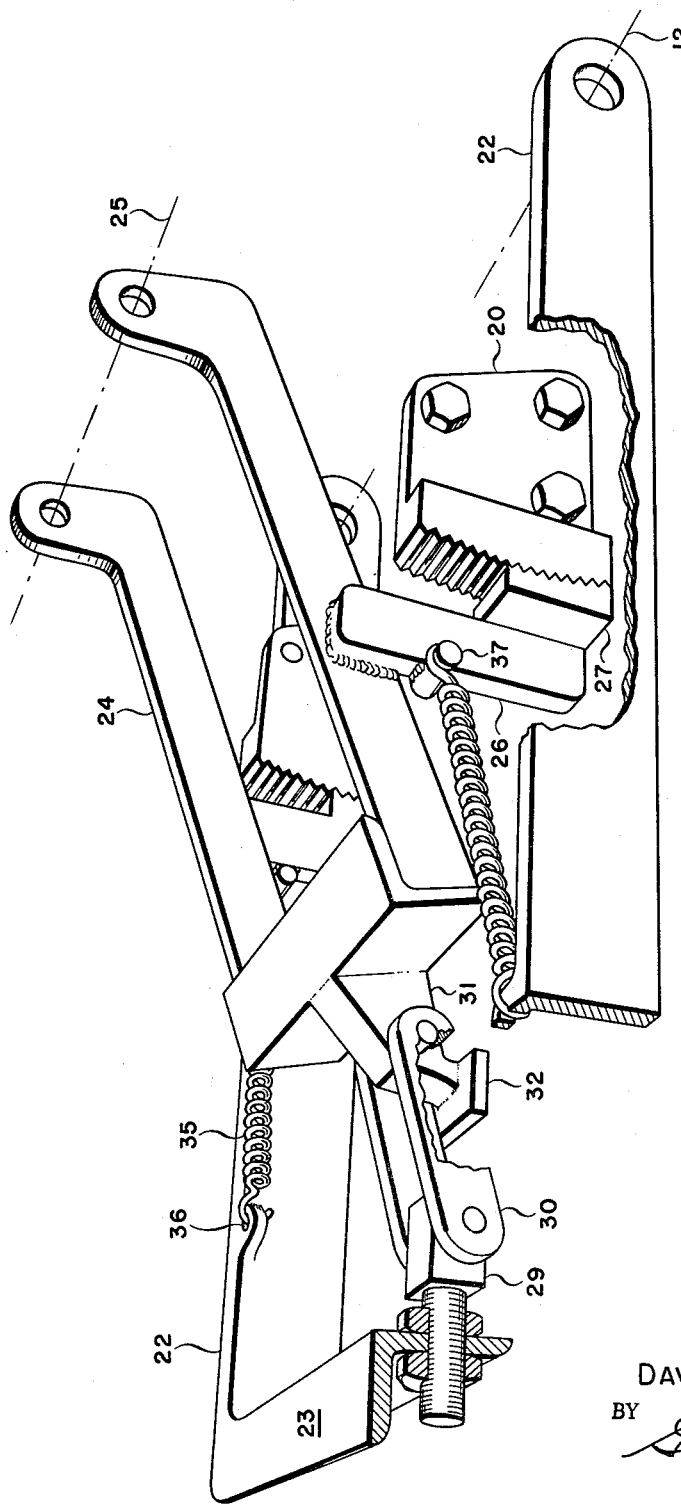
FIGURE 3 is a perspective view partially cut away to better illustrate the locking mechanism in locked position.

Operationally, when it is desired to lock out the spring action of the caster 10, thereby preventing relative movement of the housing 11 and the structural member 13, the locking mechanism of this invention is actuated to cause the engagement of the serrated locking surfaces 21 and 28. Prior to such actuation the complete mechanism is in the disengaged condition illustrated in FIGURE 2. Thus, the structural portions 11 and 13 of the caster 10 are free to move relative to one another about the axis 12. Locking is accomplished by applying a force, usually by physically stepping upon step 23, causing the frame 22 to be pivoted downward about the axis 12. This force is transmitted through the adjustable attachment 29 and the links 30 to the arm 24 through the pad 31. As soon as the slack is taken from the components resultant from the double pivoting action of the link 30 relative to its attached structure, the arm 24 is also caused to move downward carrying the extension 26 and the lock portion 27. The serrated surface 28 is moved into forcible and locking engagement with the serrated surface 21 as illustrated in FIGURES 1 and 3. The application of force to the step 23 is continued until such time as the end of the link 30 attached to the adjustable member 29 is moved into an over-center position with respect to its opposite end and the axis 12, the lower surface of the link 30 then abutting and being stopped by the shoe 32. This results in a locking action of the mechanism positively preventing the disengagement of the serrated surfaces until such time as the over-center locking feature is disengaged by the forcible upward movement of the frame 22. The springs 35 at this time are oriented to maintain a force upon the frame 22 and the extension 26 tending to increase the over-center condition of the links 30, and thereby preventing inadvertent disengagement of the lock.

While this full engagement is in effect, the ultimate result is to by-pass the action of the spring means 15 by providing a continuous and rigid structure interconnecting the otherwise relatively movable structural members 11 and 13. This rigid structure is provided from the housing 11 through the arm 24, the extension 26 and the locking portion 27 into the lock receiving portion 20 via the engaged surfaces 28 and 21, and ultimately into the structural member 13. This rigidly locked relationship is maintained by means of the serrated surfaces 21 and 28 until such time as these surfaces are disengaged through the upward movement of the frame 22 and its interconnected structure.

Any friction means may be provided upon surfaces 21 and 28 so long as when those surfaces are mutually contacted their engagement is of a locking character capable of preventing relative vertical movement thereof so long as the engagement continues.

Disengagement of the locking mechanism is accomplished by applying an upward force to step 23, thereby moving the link members 30 over-center in the opposite direction and permitting the spring members 35 to withdraw the serrated surface 28 from its locking engagement by moving the frame 22 upward.

It is sometimes desirable to simplify the manufacturing techniques utilized in the present invention by providing substantially flat engageable surfaces rather than the arcuate configurations of serrated surfaces 21 and 28. Additionally, it is sometimes desirable to provide means whereby the locking structure may be disengaged by the application of pressure to a footplate or step. Therefore, a second embodiment of the basic invention is described and illustrated in FIGURES 4 and 5. This embodiment differs in several particulars from the embodiment of FIGURES 1–3. However, the principle of operation is the same in both embodiments.

Figure 4:
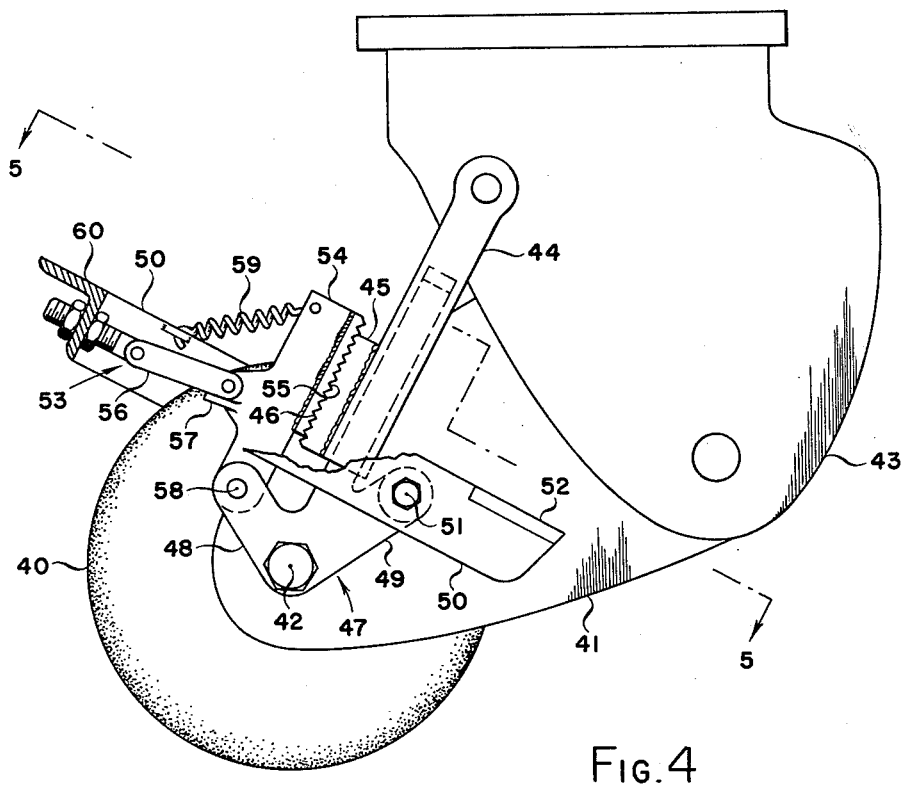
FIGURE 4 is a side elevational view of a second embodiment of the invention.
Figure 5:
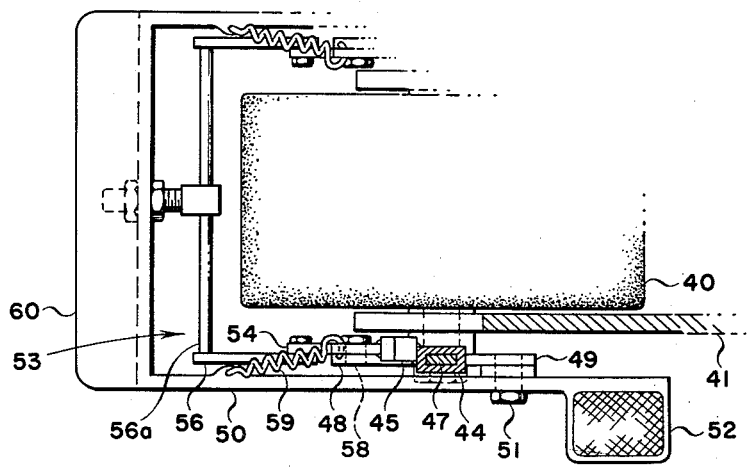
FIGURE 5 is a partially cut away view taken substantially along line 5—5 of FIGURE 4.

The embodiment of FIGURES 4 and 5 includes a wheel 40 mounted in a housing 41 for rotation about an axle 42. A second housing portion 43, comparable to the structural member 13 of FIGURE 1, is connected to the housing portion 41 and a longitudinally extending slide receptacle 44 is pivotally connected to housing portion 43 so as to extend toward axle 42. The slide receptacle 44 includes a pad 45 having a serrated surface 46 thereon. A slide member 47 is pivotally connected to the housing portion 41 for rotation about the axle 42. The slide member 47 is disposed within a portion of the slide receptacle 44 for slidable movement therein. The slide member 47 also includes a pair of outwardly extending attachment arms 48 and 49.

A frame 50, comparable to the frame 22 of FIGURES 1–3, is pivotally connected to the arm 49 about a pivot pin 51. The frame 50 extends beyond the pivot pin 51 on at least one of its sides a distance sufficient to include a step pad 52 for a purpose to be hereinafter described. A U-shaped assembly 53, roughly comparable to the arm 24, includes a locking arm 54 which is pivotally connected to the attachment arm 48 by means of a pivot pin 58 and includes a serrated surface 55 adapted for engagement with the serrated surface 46. The assembly 53 also includes a pair of link members 56 pivotally connected to the locking arm 54 and to a tie rod 56. A spring 59, or a pair thereof, is connected between the frame 50 and an upper extremity of the locking arm 54 so as to normally urge disengagement of the serrated surfaces 46 and 55 and cause the upward pivoting of the frame 50 about the pivot pin 51.

Over-center locking means similar to that described with respect to FIGURES 1–3 is provided in the present embodiment, connected between the frame 50 and the U-shaped arm assembly 53. However, in the presently illustrated configuration the link members 56 are attached outward from, as opposed to centrally of, the arm 53 and are pivoted directly upon the locking arm to which the serrated surface 56 is applied. Stop means 57 to stop down-movement of links 56 is also fixed upon the arm 53.

A pressure applied to step 60 at an outer extremity of the frame 50 causes the frame 50 to be pivoted downward about the pivot pin 51, forcing the serrated surface 55 of the locking arm 54 into locking engagement with the serrated surface 56 of the pad 45 through the interaction of the over-center locking means. The pressure is continued until such time as the link members 56 contact the stops 57 in an over-center condition, thereby preventing disengagement of the serrated surfaces and making rigid the relationships between the frame structures 41 and 43 and the structure connecting same, i.e., the slide receptacle 44 and the slide 47 via the pad 45 and the arm 54.

Disengagement of the serrated surfaces is accomplished by applying a pressure to the step pad 52 so as to force the opposite extremity of the frame 50 upward, disengaging the over-center locking means and allowing the spring 59 to accomplish the disengagement and the lifting of the frame 50.

While particular embodiments of the present invention have been illustrated and described, it will be obvious to those skilled in the art that minor changes and modifications may be made without departing from this invention in its broader aspects, and therefore, the aim in the appended claims is to cover all such changes and modifications as fall within the true spirit and scope of this invention.

I claim:
1. A lock for a sprung caster comprising:
 (a) lock receiving means fixed to a wheel-carrying, pivotally movable caster portion;
 (b) lock means engageable with said lock receiving means and pivotally supported upon a caster portion to which the movable portion is pivotally mounted;
 (c) actuator means connected to said lock means for causing engagement and disengagement of said lock means with said lock receiving means; and
 (d) separate lock means for maintaining said engagement.

2. A lock for a sprung caster having a housing portion fixed to the structure to be supported, a movable wheel-carrying portion pivotally connected to the housing portion, and spring means disposed between the housing portion and the movable portion urging separation of the wheel and the supported structure comprising:
 (a) lock receiving means fixed to the movable portion;
 (b) lock means pivotally supported upon the housing portion and engageable with said lock receiving means;
 (c) actuator means connected to said lock means for causing engagement and disengagement of said lock means and said lock receiving means; and
 (d) separate lock means for maintaining said engagement.

3. A lock for a sprung caster comprising:
 (a) a first horizontally serrated lock segment fixed to a wheel-carrying caster portion;
 (b) a frame member pivotally connected to and in common with the wheel-carrying caster portion and a lower extremity of a caster portion adapted for supporting structure, the caster portions being mutually spring loaded such that opposite ends thereof tend to separate;
 (c) a step upon said frame at a position substantially opposite said connection to the caster portions;
 (d) an arm member pivotally connected to the structure supporting caster portion at a position substantially opposite said frame connection, said arm including a second horizontally serrated lock segment adapted for locking engagement with said first segment;
 (e) an over-center lock member having a first end pivotally connected to said frame adjacent said step and a second end connected to said arm member; and
 (f) stop means attached to said arm member and adapted to be contacted by said over-center lock member to prevent excessive movement of said over-center lock member.

4. In combination:
 (a) a caster housing adapted to support a structural load;
 (b) a wheel-carrying member connected to said housing for pivotal movement with respect thereto;
 (c) spring means normally urging separation of said housing and said wheel-carrying member;
 (d) a frame connected to said housing and said wheel-carrying member and adapted to pivot about a common axis therewith;
 (e) actuator means upon said frame;
 (f) a surface including friction means thereon fixed to said frame and adapted for a locking engagement with a similar surface;
 (g) an arm connected to said housing remote from said axis for pivotal movement with respect to said housing;
 (h) a surface including friction means thereon fixed to said arm and adapted for movement into locking engagement with said first-mentioned friction means; and
 (i) lock means interconnecting said frame and said arm to maintain the respective structural relationships of said friction means when the same are mutually engaged.

5. A lock for two interconnected and relatively pivoted structures comprising:
 (a) lock receiving means mounted upon one of said structures;
 (b) a frame pivotally connected to the other said structure and having a step at a position opposite said pivoted connection;
 (c) an arm member pivotally connected to said other structure at a position remote from said frame connection;
 (d) lock means upon said arm member and engageable with said lock receiving means;
 (e) actuator means connected to said lock means for causing such engagement;
 (f) an over-center lock member pivotally connected to said frame and said arm member adjacent said step to maintain said engagement; and
 (g) stop means attached to said arm member to prevent excessive movement of said over-center lock member.

6. A lock for two interconnected and relatively pivoted structures comprising:
 (a) a slide receptacle pivotally mounted upon one of said structures and including a lock receiving means thereon; and
 (b) a slide means pivotally mounted upon the other of said structures and slidably engaged with said slide receptacle and having a lock means mounted thereon engageable with said lock receiving means.

7. A lock for two interconnected and relatively pivoted structures comprising:
 (a) a slide receptacle pivotally mounted upon one of said structures and including a lock receiving means thereon;
 (b) a slide pivotally mounted upon said other structure and engaged for reciprocation with respect to said slide receptacle;
 (c) a lock means pivotally mounted upon said slide member and engageable with said lock receiving means;
 (d) actuator means pivotally mounted to said slide member and connected to said lock means for causing said engagement; and
 (e) engagement maintaining means.

8. The lock of claim 7 wherein force receiving means is provided upon said actuator means whereby the application of force thereto accomplishes a release of said lock means.

References Cited in the file of this patent
UNITED STATES PATENTS

| | | |
|---|---|---|
| 1,244,364 | Paquette | Oct. 23, 1917 |
| 2,009,862 | Spell | July 30, 1935 |
| 2,694,945 | Jandus | Nov. 23, 1954 |